(12) United States Patent
Yu et al.

(10) Patent No.: US 7,366,237 B2
(45) Date of Patent: Apr. 29, 2008

(54) LOW COMPLEXITY REAL-TIME VIDEO CODING

(75) Inventors: Keman Yu, Beijing (CN); Jiang Li, Beijing (CN); Shipeng Li, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 10/658,839

(22) Filed: Sep. 9, 2003

(65) Prior Publication Data

US 2005/0053136 A1 Mar. 10, 2005

(51) Int. Cl.
*H04N 7/12* (2006.01)
(52) U.S. Cl. .................................. 375/240.16
(58) Field of Classification Search ........... 375/240.01, 375/240.16, 240.24, 240.26; 348/208.99; *H04N 7/12*
See application file for complete search history.

(56) References Cited

U.S. PATENT DOCUMENTS 5,682,205 A * 10/1997 Sezan et al. ........... 348/208.99
7,145,950 B2 * 12/2006 Hsu et al. .............. 375/240.16

OTHER PUBLICATIONS

"Video coding for low bit rate communication", Series H Audio-visual and Multimedia Sytems, Infrastructure of audiovisual services-Coding of moving video, ITU-T Recommendation H.263, Telecommunication Standardization Sector of ITU, Feb. 1998, 167 pgs.
"A new diamond search algorithm for fast block-matching motion estimation", Zhu et al., IEEE Transactions on image processing, vol. 9, No. 2, Feb. 2000, pp. 287-290.
"A novel small-cross-diamond search algorithm for fast video coding and videoconferencing applications", Cheung et al., Department of Electronic Engineering, City University of Hong Kong, IEEE ICIP 2002, pp. 681-684.

(Continued)

*Primary Examiner*—Young Lee
(74) *Attorney, Agent, or Firm*—Lee & Hayes, PLLC

(57) ABSTRACT

In a first exemplary media implementation, one or more processor-accessible media include processor-executable instructions that, when executed, direct a device to perform actions including: comparing an accuracy indicator to at least one threshold, the accuracy indicator corresponding to a reference macroblock selected for a target macroblock; ascertaining a refinement case from multiple refinement cases based on the comparing, each refinement case of the multiple refinement cases defining multiple test points in relation to the reference macroblock; and analyzing the ascertained refinement case with regard to the target macroblock. In a second exemplary media implementation, one or more media include processor-executable instructions that, when executed, direct a device to perform actions including: determining if two chrominance sums have magnitudes that are each less than a first product and four luminance sums have magnitudes that are each less than a second product; and if so, forwarding all zero values for a macroblock.

16 Claims, 10 Drawing Sheets

OTHER PUBLICATIONS

"A Complexity-Bounded Motion Estimation Algorithm", Chimienti et al., IEEE Transactions on Image Processing, vol. 11, No. 4, Apr. 2002, pp. 387-392.

"MPEG-4 Video Verification Model version 16.0", Fukunaga et al., ISO/IEC JTC1/SC29/WG11 N3312, Mar. 2000/Noordwijkerhout, pp. 1-380.

"Video Compression Using Integer DCT", Chen et al., ECE Department, Boston University, IEEE 2000, pp. 844-845.

"Performance Enhancement of H.263 Encoder Based on Zero Coefficient Prediction", Yu et al., Computer Systems Laboratory, Stanford University, ACM Multimedia 97, Seattle, USA, Copyright 1997, pp. 21-29.

"Statistical Computation of Discrete Cosine Transform in Video Encoders", Sun et al., Journal of Visual Communication and Image Representation, vol. 9, No. 2, Jun. 1998, pp. 1-22(originally pp. 163-170).

"On Improving MPEG Spatial Scalability", Domanski et al., Poznan University of Technology, Institute of Electronics and Telecommunications, Poland, IEEE 2000, pp. 848-850.

* cited by examiner

LOW COMPLEXITY REAL-TIME VIDEO CODING

TECHNICAL FIELD

This disclosure relates in general to video coding and in particular, by way of example but not limitation, to a low complexity real-time video codec that may be employed e.g. in resource-limited devices.

BACKGROUND

Video communication, such as video conferencing involving two or more parties, is becoming increasingly popular as the visual quality improves and the cost decreases. With video communication a first party is able to interact visually with a second party across a communication channel that has a finite bandwidth. An image of the first party is usually acquired with a camera as a series of frames. In order to transmit the frames from the first party to the second party across the communication channel, the video frames are encoded to reduce their bandwidth.

When a codec is applied to video frames, a video bitstream is produced that has a reduced bandwidth. Significant research has been devoted to developing codecs that result in video bitstreams with low bandwidth usage and high quality images (e.g., good rate-distortion performance). Such codecs have therefore become increasingly elaborate and complex. Consequently, these codecs make ever-increasing demands on the resources of video encoding devices.

Some devices, such as fixed and dedicated video conferencing equipment, have sufficient resources to employ these complex codecs. However, other devices do not have sufficient resources to satisfactorily employ modern codecs. For example, many mobile devices suffer from weak computational power, short battery lifetime, and limited display capability.

Accordingly, there is a need for schemes and/or techniques that simplify video coding so that a resource-friendly video codec may be employed in resource-limited devices while good video quality is maintained.

SUMMARY

In a first exemplary media implementation, one or more processor-accessible media include processor-executable instructions that, when executed, direct a device to perform actions including: comparing an accuracy indicator to at least one threshold, the accuracy indicator corresponding to a reference macroblock selected for a target macroblock; ascertaining a refinement case from multiple refinement cases based on the comparing, each refinement case of the multiple refinement cases defining multiple test points in relation to the reference macroblock; and analyzing the ascertained refinement case with regard to the target macroblock.

In a second exemplary media implementation, one or more processor-accessible media include processor-executable instructions that, when executed, direct a device to perform actions including: determining if two chrominance sums have magnitudes that are each less than a first product and four luminance sums have magnitudes that are each less than a second product; and if so, forwarding all zero values for a macroblock.

In a first exemplary device implementation, a device is adapted to refine a reference macroblock selection based on at least one threshold and responsive to an accuracy indicator corresponding to the reference macroblock selection.

In a second exemplary device implementation, a device is adapted to bypass transformation and quantization calculations of error values for a macroblock when a magnitude of each DC coefficient for each luminance block of the macroblock is less than a predetermined luminance threshold and a magnitude of each DC coefficient for each chrominance block of the macroblock is less than a predetermined chrominance threshold.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
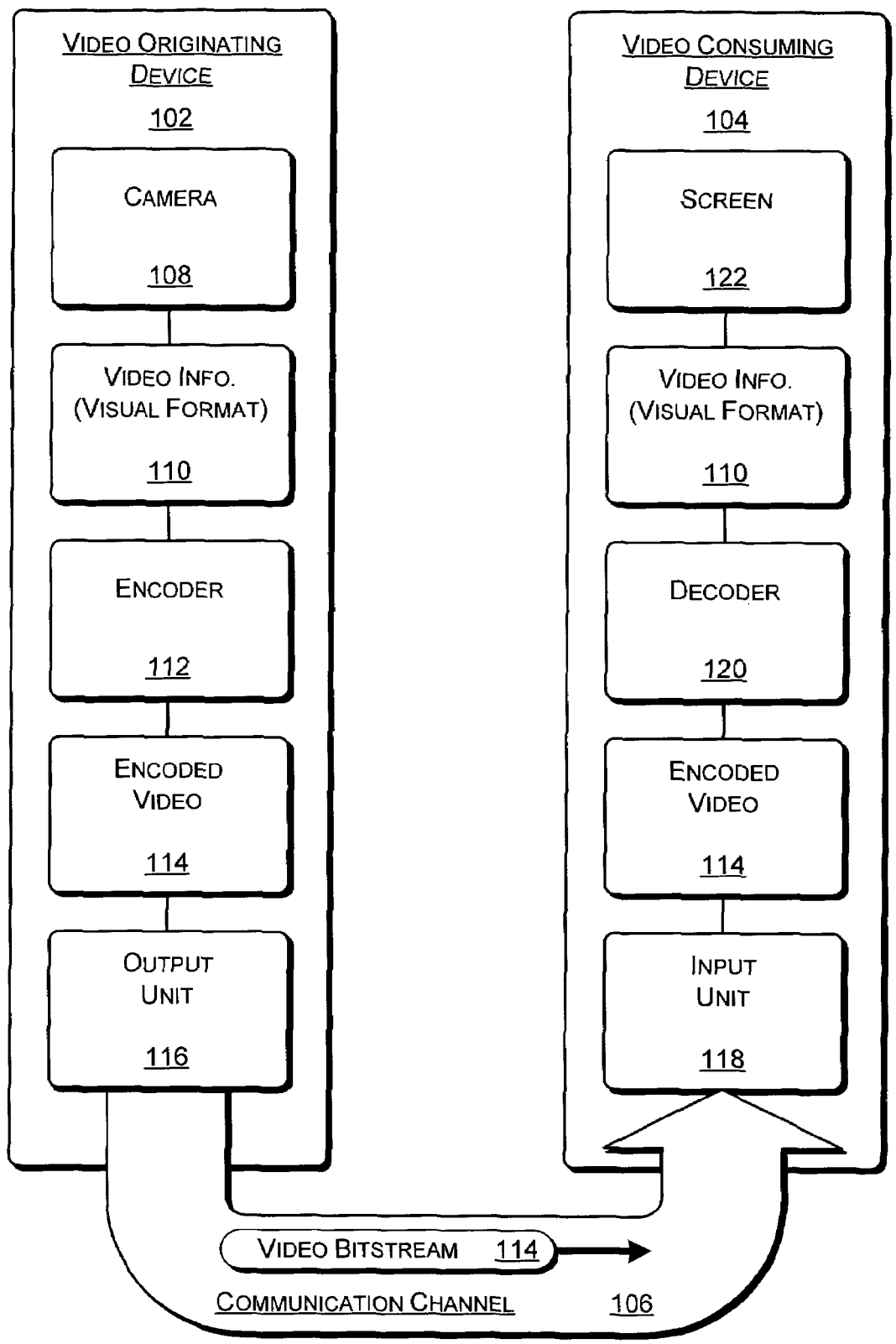
FIG. 1 illustrates an exemplary video originating device and an exemplary video consuming device that are coupled by a communication channel.

FIG. 1 illustrates an exemplary video originating device 102 and an exemplary video consuming device 104 that are coupled by a communication channel 106. As part of a video communication, video originating device 102 sends encoded video bitstream 114 across communication channel 106 to video consuming device 104.

In a described implementation, video originating device 102 includes a camera 108, video information 110, an encoder 112, encoded video 114, and an output unit 116. Video consuming device 104 includes an input unit 118, encoded video 114, a decoder 120, video information 110, and a screen 122. As illustrated, video bitstream 114 is located at and propagating on communication channel 106.

Although not specifically shown, video originating and consuming devices 102 and 104 may also include a battery, especially if such devices 102 and 104 are mobile devices. Furthermore, for two-way video communication, video originating device 102 may include an input unit 118, a decoder 120, and a screen 122, and video consuming device 104 may include a camera 108, an encoder 112, and an output unit 116. An exemplary general device that includes processor(s), media, buses, etc. is described below with reference to FIG. 10.

In an exemplary operation, video images are observed and input at camera 108. These video images are created as video information 110 from camera 108. Video information 110 is in a visual format, such as one or more video frames. Video information 110 is provided to encoder 112. Video information 110 is usually input to encoder 112 in a YUV (luminance-bandwidth-chrominance) format. Encoder 112 utilizes a video codec, such as the one described further herein below, to compress video information 110 to produce encoded video 114 (e.g., a video bitstream 114). An exemplary video encoder 112 is described further below with reference to FIG. 2.

Output unit 116 accepts encoded video 114 and sends it along communication channel 106 towards video consuming device 104. Output unit 116 handles transmission responsibilities (e.g., transport layer compliance, physical interfaces, etc.). These transmission responsibilities may include packetization, encryption, reliability, some combination thereof, and so forth. Communication channel 106 may be any wired or wireless medium or any series or combinations thereof.

Video consuming device 104 receives video bitstream 114 via communication channel 106 at input unit 118. After handling any symmetric or analogous reception responsibilities, input unit 118 forwards encoded video 114 to decoder 120. Decoder 120 decodes encoded video 114 to produce video information 110. Video information 110, which is in a visual format, may then be displayed on screen 122.

Figure 2:
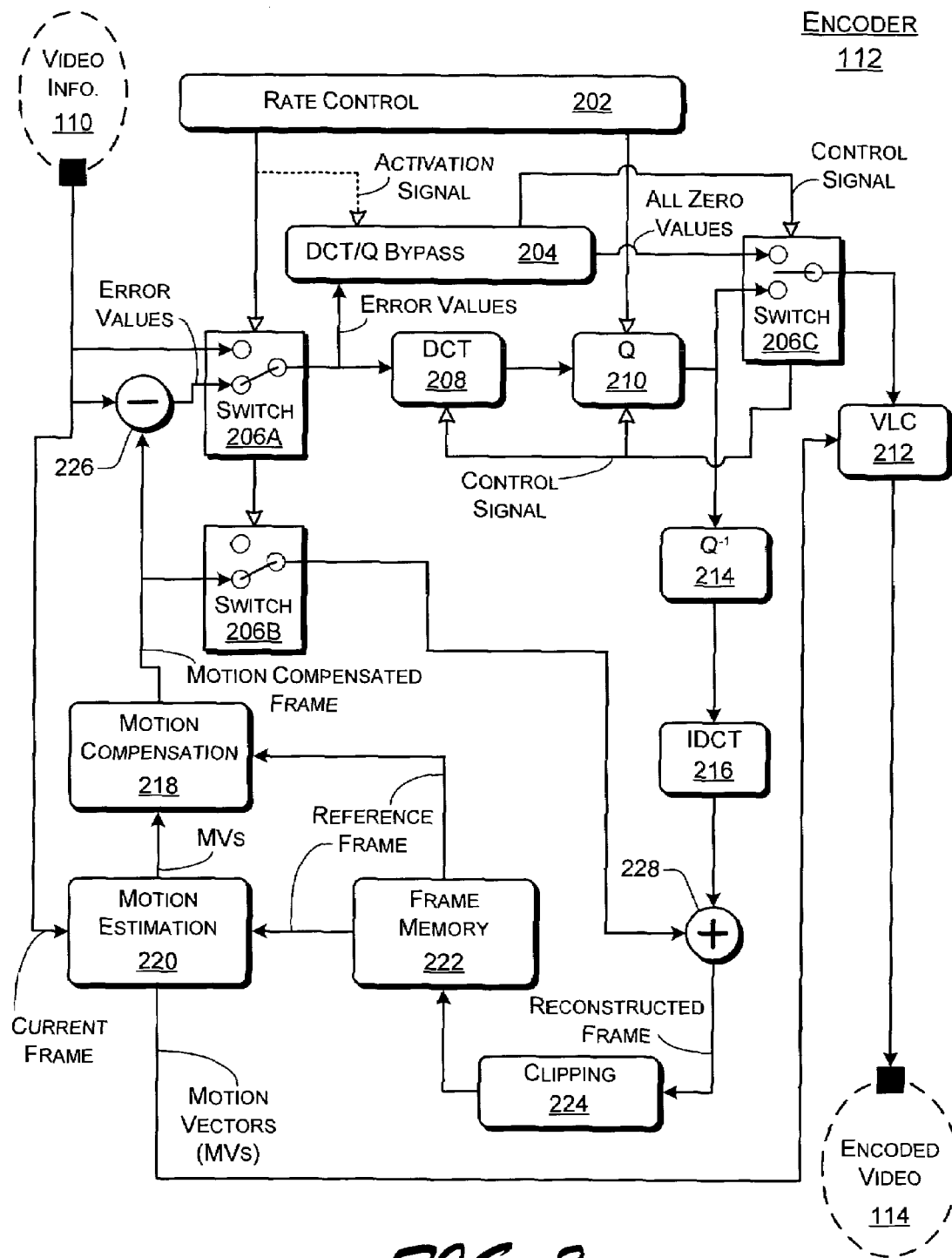
FIG. 2 is an exemplary video encoder for the video originating device of FIG. 1.

FIG. 2 is an exemplary video encoder 112 for video originating device 102 of FIG. 1. Encoder 112 accepts as input video information 110 and produces as output encoded video 114. Video information 110 is in a visual, frame-based format. Encoded video 114 is in a video bitstream format.

In a described implementation, the video bitstream format of encoded video 114 is compatible with the bitstream syntax of an ITU-T recommended H.263 encoder. Moreover, the structure of encoder 112 is similar to that of the H.263 encoder. However, other structures and bitstream syntaxes may alternatively be employed.

Encoder 112 includes a number of components that are implemented in software in a described implementation. Nevertheless, any one or more of these components may also be implemented fully or partially in hardware, firmware, some combination thereof, and so forth. As illustrated, encoder 112 includes the following components: rate control 202, DCT/Q bypass 204, switches 206A/B/C, DCT 208, Q 210, variable length coding (VLC) 212, $Q^{-1}$ 214, IDCT 216, motion compensation 218, motion estimation 220, frame memory 222, and clipping 224.

Switches 206A and 206B control the frame coding mode. Frames can be coded as intra frames (e.g., I frames) or inter frames (e.g., predicted (P) frames, bi-directional (B) frames, etc.). When switches 206A and 206B are in the upper position, intra frames are encoded with no prediction. When switches 206A and 206B are in the lower position, inter frames are encoded with some amount of prediction.

Video information 110 is segmented in accordance with a macroblock approach in a described implementation. However, other approaches to frame segmentation may alternatively be employed. An exemplary macroblock frame segmentation approach is described further below with reference to FIG. 3.

Rate control 202 controls the frame coding mode via switches 206A and 206B and the quantization (Q) level via Q 210 as indicated by the control arrows (those arrows with empty points). As indicated by an activation signal, rate control 202 may also control whether DCT/Q bypass 204 is functional.

In operation for intra frame coding, video frames from video information 110 are passed through switch 206A at an upper input and then transformed from the spatial domain into the frequency domain at discrete cosine transform (DCT) 208. The transformed values are quantized at Q 210. The transformed and quantized values then pass through switch 206C and are provided to VLC 212. VLC 212 may use a Huffman coding or similar approach, for example.

The transformed and quantized values are also provided to inverse quantization ($Q^{-1}$) 214. The de-quantized but transformed values are applied to inverse DCT (IDCT) 216 to transform the frequency domain values back to spatial domain values. This reconstructs the video frame to produce the reconstructed frame, as indicated in FIG. 2.

DCT 208 and IDCT 216 may be implemented with floating-point mathematical operations. However, floating-point DCT involves substantial floating-point calculations, especially multiplications that use heavy computational and power resources. Consequently, DCT 208 and IDCT 216 use integer mathematical calculations in a described implementation. Specifically, DCT 208 implements integer DCT calculations in the form of shift operations and additions, with internal nodes having a finite precision. For example, an 8-pt integer DCT scheme with a complexity of 45 additions and 18 shift operations can provide performance that is comparable to a floating-point DCT scheme, and the integer DCT scheme is more flexible in resource-limited environments.

To comport with the H.263 recommendation, for example, the indicated reconstructed frame may undergo clipping at clipping block 224 prior to being provided to frame memory 222. Frame memory 222 therefore stores a reference frame, as indicated in FIG. 2, for inter frame coding. Although a described implementation uses a (single) previous frame as the reference frame, the reference frame may alternatively be a future frame (e.g., as for B frame encoding). Furthermore, multiple reference frames may be used for motion estimation of a single current frame.

Motion estimation 220 receives as input the reference frame from frame memory 222. Motion estimation 220 also receives as input a current frame of video information 110. The current frame is subsequent to the intra-encoded frame described above, and this current frame is being encoded as an inter frame. Consequently, switches 206A and 206B are in the lower position, which is the illustrated position in FIG. 2.

In a described implementation, motion estimation 220 therefore receives a current frame and a (previous) reference frame. Motion estimation 220 compares the current frame to the reference frame at a macroblock level to determine a motion vector (MV) for each macroblock. The motion vector indicates a direction and distance away from a current macroblock of the current frame and to a similar (including identical) reference macroblock in the reference frame. The motion vector may be provided in units of pixels, for example. An exemplary motion estimator 220 that can reduce or eliminate some computations is described further below with reference to FIG. 4.

Motion vectors are forwarded from motion estimation 220 to motion compensation 218 and VLC 212. The forwarded motion vectors at VLC 212 represent part of the encoded video information for the current frame. The other part of the encoded video information is one or more error values, which are described below with reference to motion compensation 218 and a difference component 226.

Motion compensation 218 accepts as input the motion vectors from motion estimation 220 and the reference frame from frame memory 222. Motion compensation 218 uses the motion vectors and the reference frame to produce a motion compensated frame, as indicated in FIG. 2. This motion compensated frame is a grouping of reference macroblocks retrieved from the reference frame in accordance with the motion vectors. (A motion compensated frame may also include other macroblocks, such as intra macroblocks, in certain situations.) The motion compensated frame includes errors, inasmuch as it is at least partially a product of the estimates of motion estimation 220. These errors are described further below with reference to difference component 226.

The motion compensated frame is forwarded to difference component 226 and is directed toward a summation component 228 via switch 206B. The summation performed by summation component 228 is described further below. Difference component 226 accepts as input the actual current frame of video information 110 and the motion compensated frame having the estimation errors. Difference component 226 determines the difference between the current frame and the motion compensated frame to produce error values, as indicated in FIG. 2. In order to satisfactorily reproduce the current frame at video consuming device 104 (not shown in FIG. 2), these error values can be transmitted thereto after application to VLC 212. However, the bandwidth occupied by these error values may be reduced using DCT 208 and Q 210.

Hence, the error values are passed through switch 206A at a lower input so that they can be applied to DCT 208 and Q 210. These error values are often sufficiently small such that their transformed versions quantize to zero after Q 210. In fact, for some or even many macroblocks (e.g., depending on video subject matter, estimation quality, etc.), all of the transformed and quantized values for a particular macroblock may be zero. If/when these all zero quantized (AZQ) values for a particular macroblock can be forecasted from the error values, the computations of DCT 208 and Q 210 can be avoided. DCT/Q bypass 204 is capable of making such forecasts of these AZQ values from the error values.

DCT/Q bypass 204 may optionally be activated by rate control 202 for inter frame coding modes as indicated by the dashed-line activation signal. Typically, fewer macroblocks during intra frame coding modes are AZQ, so DCT/Q bypass 204 may be idle in these intra frame coding modes.

DCT/Q bypass 204 accepts as input the error values from switch 206A and produces as output all zero values and a control signal, as indicated in FIG. 2. The all zero values are provided as an upper input to switch 206C, and the control signal is provided as a control to switch 206C (as well as to DCT 208 and Q 210). When DCT/Q bypass 204 forecasts that a particular macroblock is likely to be AZQ based on the input error values for the particular macroblock, DCT/Q bypass 204 provides the all zero values to switch 206C. Additionally, when the particular macroblock is forecast to be AZQ, the control signal from DCT/Q bypass 204 controls switch 206C to be in the upper position and disables DCT 208 and Q 210.

Otherwise, the control signal from DCT/Q bypass 204 (or a general default condition) causes switch 206C to be in the lower position and enables DCT 208 and Q 210. It should be noted that DCT/Q bypass 204 may constantly output the all zero values such that the control signal causes switch 206C to input the all zero values when DCT/Q bypass 204 forecasts that the input error values for a given macroblock are AZQ. The all zero values or the transformed and quantized error values, depending on the condition of switch 206C, are forwarded from switch 206C to VLC 212. VLC 212 then combines the selected values with the motion vectors received from motion estimation 220 using a variable length encoding scheme to produce a bitstream for encoded video 114.

Figure 3:
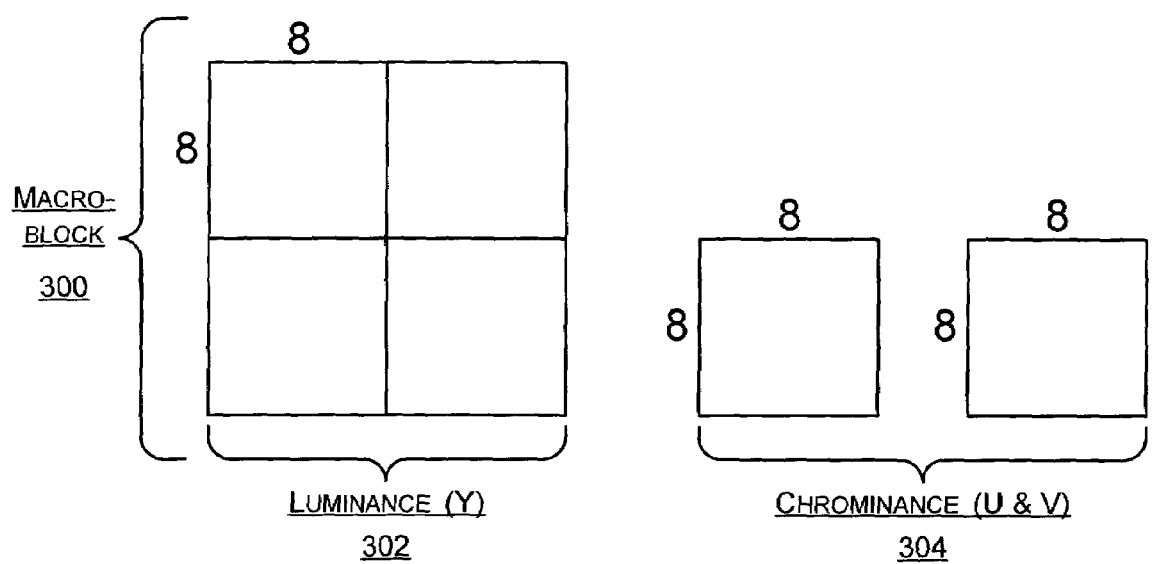
FIG. 3 is an exemplary macroblock for segmentation of a video frame.

FIG. 3 is an exemplary macroblock 300 for segmentation of a video frame of video information 110 (as illustrated in FIGS. 1 and 2). Macroblock 300 includes a luminance (Y) portion 302 and two chrominance (U & V) portions 304. Because the human eye perceives luminance information with greater acuity, more data for luminance 302 is recorded than for chrominance 304. In fact, each macroblock 300 has twice as much luminance 302 data as chrominance 304 data, and four times more overall luminance-Y data as individual chrominance-U or chrominance-V data.

As illustrated, each luminance portion 302 is divided into four blocks that are eight (8) pixels by eight (8) pixels. Chrominance portion 304 includes two blocks that are also eight (8) pixels by eight (8) pixels. In a described implementation, a motion vector is estimated (e.g., by motion estimator 220 of FIGS. 2 and 4) for each such macroblock 300. However, other approaches may alternatively be employed. Furthermore, other macroblock formulations, layouts, pixel counts, etc. may be used with video encoder 112 (of FIG. 2). Additionally, non-macroblock and/or variable-sized segmentation approaches may be utilized with video encoder 112.

Figure 4:
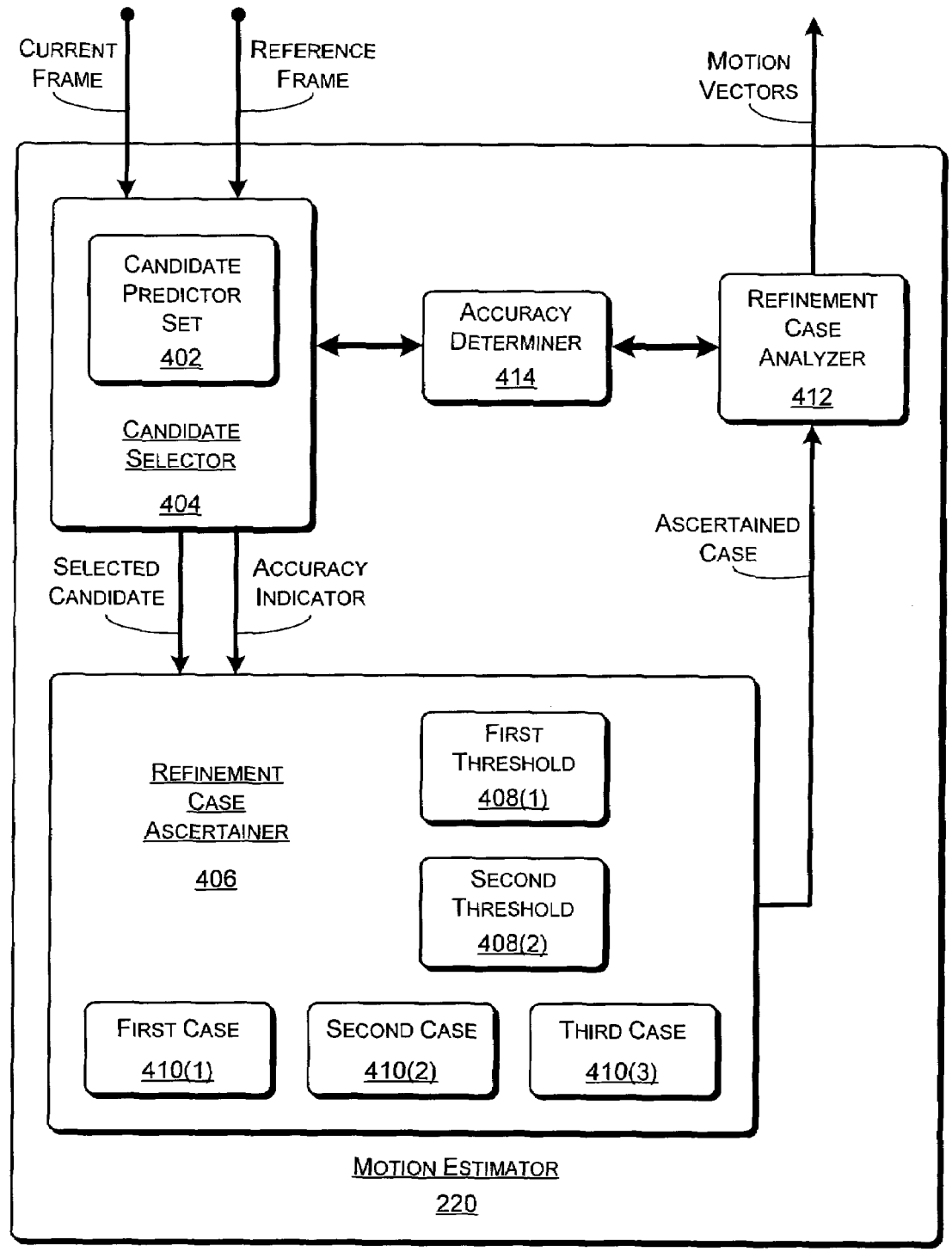
FIG. 4 is an exemplary motion estimator for the video encoder of FIG. 2.

FIG. 4 is an exemplary motion estimator 220 for video encoder 112 of FIG. 2. As illustrated, motion estimator 220 accepts as input both a current frame and a reference frame, and motion estimator 220 produces and forwards as output motion vectors. In a described implementation, motion estimator 220 includes a candidate selector 404, a refinement case ascertainer 406, an accuracy determiner 414, and a refinement case analyzer 412.

Generally, motion estimation reduces temporal redundancy between adjacent or proximate frames. Unfortunately, motion estimation typically consumes a significant, if not the largest, amount of computational resources in a video encoder. One approach to faster motion estimation to alleviate the heavy computational load is a predictive algorithm (PA). The complexity of the PA is comparatively low, and its execution time is relatively constant because recursive searches are generally avoided with this algorithm.

The PA utilizes an observed characteristic of video images in which macroblocks that are close to a current macroblock, in space and in time, are highly likely to have the same motion. Thus, instead of testing all possible motion vectors as with a full search, previously calculated motion vectors of spatially and temporally contiguous (and/or proximate) macroblocks comprise a set of candidate predictors 402. The most accurate motion vector candidate is then selected by candidate selector 404. This selected candidate may then be refined by refinement case ascertainer 406.

Figure 5:
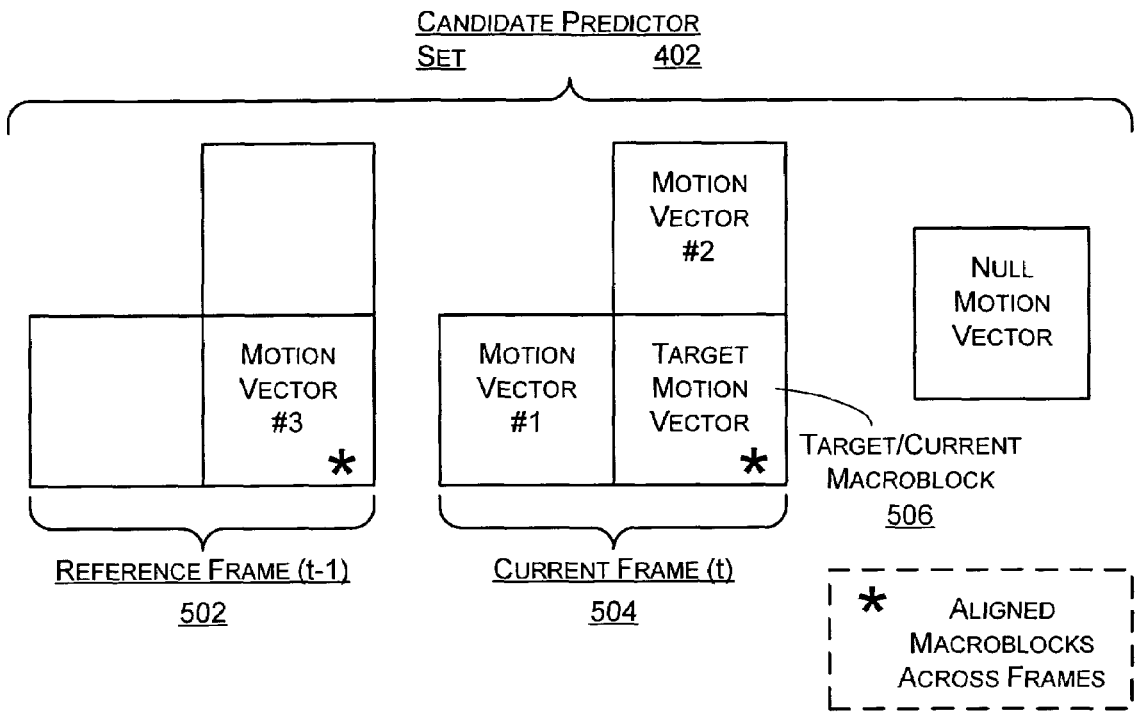
FIG. 5 is an exemplary candidate predictor set for the motion estimator of FIG. 4.

FIG. 5 is an exemplary candidate predictor set 402 for motion estimator 220 of FIG. 4. A portion of current frame 504 (at time t) and a portion of reference frame 502 (at time t-1) are shown. Each illustrated square represents an individual macroblock, including a target/current macroblock 506. The target motion vector of target macroblock 506 is the motion vector that is currently being estimated. As indicated by the asterisks, the lower right blocks correspond to aligned macroblocks across successive video frames.

Generally in a described implementation, candidate predictor set 402 contains three motion vectors plus a null vector. This three-vector-plus-null set usually achieves an acceptable, if not good, compromise between computational savings and performance loss. Specifically, candidate predictor set 402 includes: two spatially-contiguous motion vector predictors belonging to current frame portion 504, one temporally-contiguous motion vector predictor belonging to reference frame portion 502, and a null motion vector.

The target motion vector that is being estimated by motion estimator 220 corresponds to target macroblock 506. Motion vector #1 is from a first macroblock that is adjacent to target macroblock 506 in the current frame, and motion vector #2 is from a second macroblock that is also adjacent to target macroblock 506, where the first and second macroblocks are orthogonally located with respect to one another. Motion vector #3 is from a third macroblock that is aligned with target macroblock 506 in a reference frame (e.g., an immediately previous video frame).

Each motion vector candidate, whether from the current frame or the reference frame, identifies a location of and corresponds to a reference macroblock candidate in the reference frame. A motion vector identifies its corresponding reference macroblock in relation to target macroblock 506. Inasmuch as there can be a two-way mapping from a motion vector to its corresponding reference macroblock and vice versa (i.e., either one can be determined from the other one), a motion vector and its corresponding reference macroblock are at least partially equivalent in terms of some of the information that each implicitly embodies.

Candidate selector 404 (of FIG. 4) analyzes candidate predictor set 402 by comparing the quality of each of the three candidate motion vector predictors. Specifically, candidate selector 404 utilizes accuracy determiner 414 to attain an accuracy indicator (e.g., a prediction accuracy value) for each of the three candidate motion vector predictors.

In a described implementation, the accuracy indicator reflects the minimization of a cost function that measures the mismatch between a reference macroblock (as identified by the given candidate motion vector) and target/current macroblock 506. An example of an accuracy indicator is the sum of absolute differences (SAD). With SAD, the candidate motion vector predictor corresponding to the lowest SAD is the most accurate. Other accuracy indictors include residuals, differences, prediction errors, and so forth.

Thus, candidate selector 404 compares three determined accuracy indicators from accuracy determiner 414 to select the corresponding most accurate candidate motion vector predictor. The selected motion vector candidate is forwarded from candidate selector 404 to refinement case ascertainer 406 along with the corresponding accuracy indicator.

Refinement case ascertainer 406 accepts as input the selected motion vector candidate as well as the accuracy indicator corresponding thereto. In a described implementation, refinement case ascertainer 406 refines the selected motion vector candidate based on a first threshold 408(1) and a second threshold 408(2) responsive to the accuracy indicator. Depending on the value of the accuracy indicator in relation to first and second thresholds 408(1) and 408(2), a first case 410(1), a second case 410(2), or a third case 410(3) is ascertained for analysis.

Figure 6A:
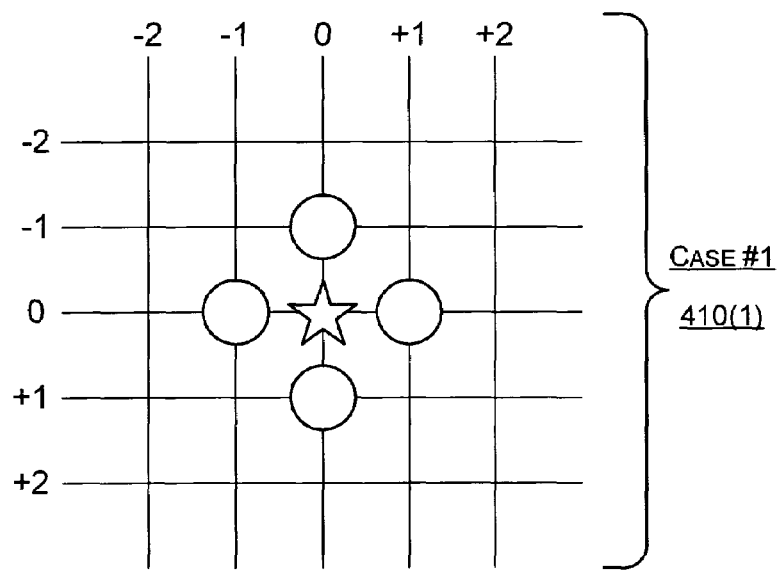
FIGS. 6A, 6B, and 6C are exemplary refinement cases for the motion estimator of FIG. 4.
Figure 6B:
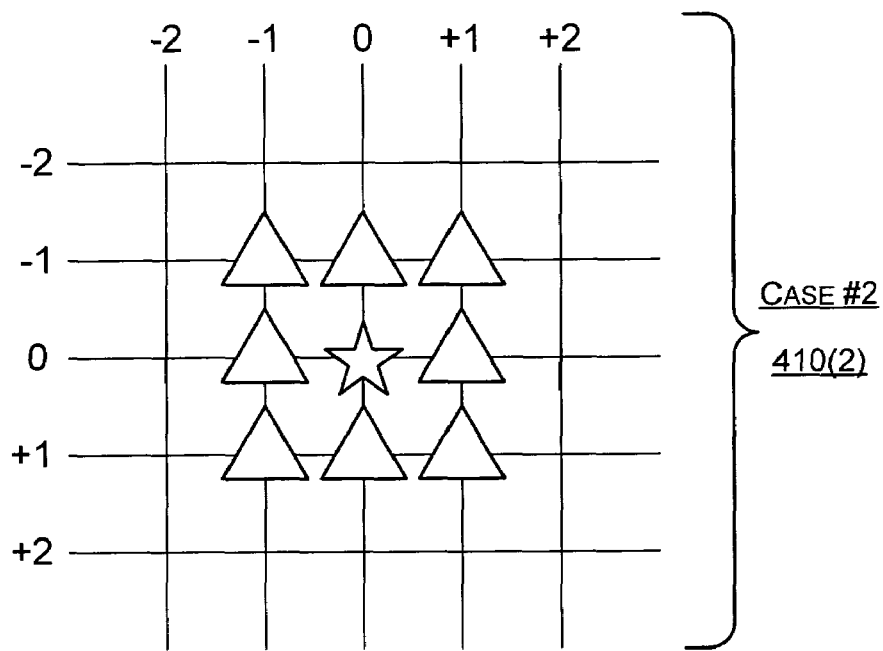
Figure 6C:
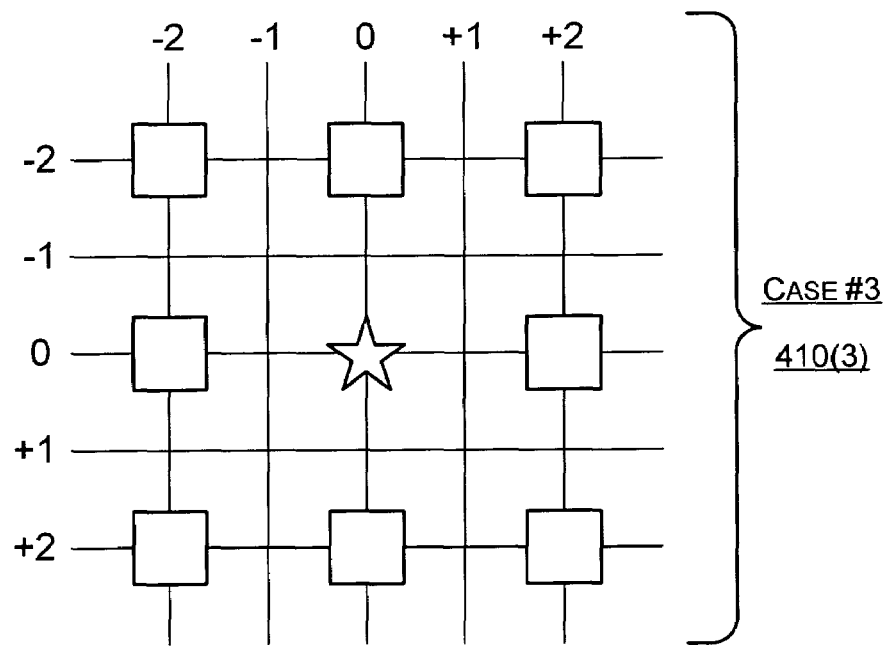

FIGS. 6A, 6B, and 6C are exemplary refinement cases 410(1), 410(2), and 410(3), respectively, for motion estimator 220 of FIG. 4. Refinement cases 410 define one or more test points (e.g., a collection of test points) in relation to the reference macroblock. Refinement cases 410 are graphed as an intersecting grid of pixels having −2, −1, 0, +1, +2 along the abscissa axis and having −2, −1, 0, +1, +2 along the ordinate axis. The origin (0, 0) corresponds to the location to which the selected motion vector candidate points (e.g., the corresponding reference macroblock) and therefore also corresponds to the accuracy indicator thereof. A five-pointed star marks this origin in each case 410.

Other symbols mark potential test pixel refinement locations, or points. Each marked point represents a point to which the selected motion vector candidate is adjusted into a test motion vector and therefore a point at which a test reference macroblock is re-centered. The test points for case #1 410(1) are marked with circles; the test points for case #2 410(2) are marked with triangles; and the test points for case #3 410(3) are marked with squares. Although only two thresholds 408(1,2) and three refinement cases 410(1,2,3) are used in this described implementation, more or fewer of either or both of thresholds 408 and refinement cases 410 may alternatively be utilized.

For case #1 410(1), four circles are located on the cross direction at one pixel distance from the star at the origin. For case #2 410(2), eight triangles are located around the selected motion vector candidate on the cross direction and on the diagonal or "X" direction at one pixel distance from the star at the origin. For case #3 410(3), eight squares are located around the selected motion vector candidate on the cross direction and on the diagonal or "X" direction at a two-pixel distance from the star at the origin.

Which refinement case 410 is ascertained and earmarked for further analysis depends on (i) first and second thresholds 408(1) and 408(2) and (ii) the accuracy indicator. The PA may thus be augmented with a refinement phase that helps to make the selected motion vector candidate better approximate the actual motion. The refinement phase implements an adaptive search approach responsive to the accuracy indicator corresponding to the selected motion vector candidate.

In a described implementation, the accuracy indicator comprises an SAD value. Thus, an exemplary refinement case ascertainer 406 (of FIG. 4) may utilize the following criteria in order to compare the SAD value to first and second thresholds 408(1) and 408(2):

If SAD<=First Threshold 408(1), then First Case 410(1) is ascertained such that four points on the cross direction are tested.

If First Threshold 408(1)<SAD<=Second Threshold 408(2), then Second Case 410(2) is ascertained such that eight points around the selected motion vector candidate are tested.

If SAD>Second Threshold 408(2), then Third Case 410(3) is ascertained such that eight points that are around and that are two pixels away from the selected motion vector candidate are tested.

Thus, the SAD of the most accurate candidate predictor is evaluated for choosing the testing refinement points.

In some circumstances, for example when a scene changes or there is a sudden motion change, the most accurate candidate predictor is not sufficiently reliable. This lack of reliability can be indicated by a large SAD value. Increasing the search area, as shown in refinement case #3 410(3), at least partially addresses this issue. A suitable exemplary numerical value for first threshold 408(1) is 4000, and a suitable exemplary numerical value for second threshold 408(2) is 6000. However, other numerical values may alternatively be employed (e.g., a lower threshold of between 3500 and 4500, and an upper threshold of between 5500 and 6500). These numerical values may be determined experimentally, for example, for individual encoding paradigms and/or video types.

Refinement case ascertainer 406 thus ascertains a refinement case 410(1, 2, or 3) based on first and second thresholds 408(1) and 408(2) and responsive to the accuracy indicator corresponding to the selected motion vector candidate. The ascertained case is output from refinement case ascertainer 406 and provided to refinement case analyzer 412.

Refinement case analyzer 412 accepts the ascertained case as input and analyzes the ascertained refinement case 410(1, 2, or 3). For each test point of the ascertained refinement case 410(1, 2, or 3), an associated test reference macroblock is compared to target macroblock 506. Specifically, refinement case analyzer 412 uses accuracy determiner 414 to attain a corresponding accuracy indicator for each test point to thereby attain a collection of accuracy indicators.

The best (e.g., lowest) accuracy indicator is identified from the collection of accuracy indicators for the ascertained case. This collection may also include the accuracy indicator forwarded to refinement case ascertainer 406 from candidate selector 404 for the central pixel (with the star marking) of any given refinement case 410. The motion vector for the associated test reference macroblock (including possibly that of the central pixel) that corresponds to the identified best accuracy indicator is the estimated motion vector. The estimated motion vector is output from refinement case analyzer 412 and thus motion estimator 220 as the motion vector corresponding to target/current macroblock 506.

Figure 7:
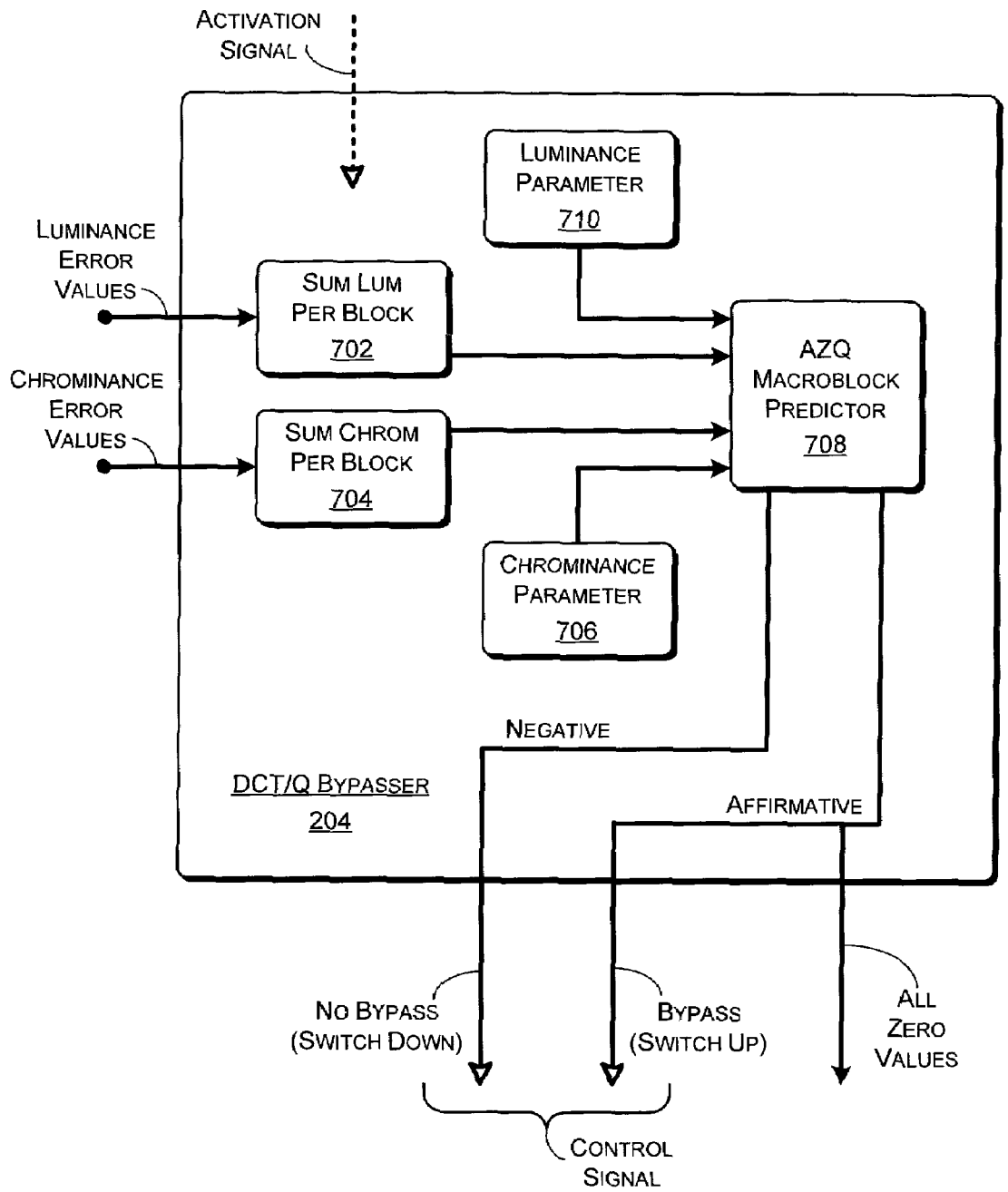
FIG. 7 is an exemplary DCT/Q bypasser for the video encoder of FIG. 2.

FIG. 7 is an exemplary DCT/Q bypasser 204 for video encoder 112 of FIG. 2. DCT/Q bypasser 204 determines when a particular macroblock is likely to have AZQ values. If the particular macroblock is forecasted to have AZQ values, then DCT/Q bypasser 204 forwards all zero values.

In a described implementation, DCT/Q bypasser 204 receives as input both luminance error values and chrominance error values, as well as an activation signal. DCT/Q bypasser 204 forwards as output a control signal and all zero values. As illustrated, DCT/Q bypasser 204 includes a summation of luminance values per block component 702, a summation of chrominance values per block component 704, a chrominance parameter 706, an AZQ macroblock predictor 708, and a luminance parameter 710.

DCT and quantization functionalities are computationally intensive. For example, quantization involves multiplications. At least some of the DCT and quantization calculations can be skipped with the DCT/quantizer bypass algorithm of DCT/Q bypasser 204. The algorithm is based on two observations: first, for most sequences at low bit rates, a significant portion of macroblocks have DCT coefficients that are all reduced to zero after quantization; secondly, in the majority of inter-macroblocks, the DC coefficient of the DCT of any given block of an inter-macroblock has a larger magnitude than all the other coefficients in the given transformed block.

Because the DCT coefficients in a block quantize to zeros when their magnitudes are less than 2Q, where the variable Q is the quantization parameter, it is possible to predict AZQ macroblocks using the DC coefficients of their constituent blocks. Hence, the DCT and quantization calculations associated with those AZQ macroblocks can be eliminated.

Generally, DCT/Q bypasser 204 functions when active in accordance with the (optional) activation signal. In a described implementation, the DCT/Q bypasser 204 is active during the processing of inter-macroblocks but inactive during the processing of intra-macroblocks because intra-macroblocks are less likely to satisfy the condition that the frequency-domain DC coefficient has the largest magnitude.

Summation of luminance values per block component 702 receives the luminance error values, which amount to four sets of 64 luminance values (four luminance blocks 302 that are each 8×8 pixels). Summation of chrominance values per block component 704 receives the chrominance error values, which amount to two sets of 64 chrominance values (two chrominance blocks 304 that are each 8×8 pixels). It should be noted that one-eighth (⅛) the sum of the 64 error values in the temporal domain of a given block is equivalent to the DC coefficient of the discrete-cosine-transformed frequency domain of the given block.

AZQ macroblock predictor 708 predicts or forecasts if/whether a particular macroblock 300 is likely to be AZQ responsive to both the luminance error values and the chrominance error values, which facilitates preservation of both luminance and chrominance video qualities. AZQ macroblock predictor 708 accepts as input four luminance error value sums from summation of luminance values per block component 702, two chrominance error value sums from summation of chrominance values per block component 704, luminance parameter 710, and chrominance parameter 706.

Specifically, AZQ macroblock predictor 708 determines that a particular macroblock is to be regarded as AZQ if magnitudes (e.g., absolute values) of the summations of the six error value sets of the six different blocks of the particular macroblock are sufficiently small, especially with respect to the quantization parameter Q. More specifically, AZQ macroblock predictor 708 determines that a particular macroblock is to be regarded as AZQ (i) if the summations of the four luminance blocks have magnitudes that are each sufficiently small with respect to the quantization parameter Q in conjunction with luminance parameter 710 and (ii) if the summations of the two chrominance blocks have magnitudes that are each sufficiently small with respect to the quantization parameter Q in conjunction with chrominance parameter 706.

For example, given that the block summations are equivalent to eight (8) times the DC coefficients, a particular macroblock may be regarded as AZQ (i) if the DC coefficients of the four 8×8 luminance blocks 302 in the particular macroblock have magnitudes less than 2Q and (ii) if the DC coefficients of the two 8×8 chrominance blocks 304 in the particular macroblock also have magnitudes less than 2Q.

An alternative, more stringent criteria for AZQ macroblock predictor 708 is provided as follows:

$|Sum_{LumBlock}| < \alpha \times Q$, and                             Criterion #1:

$|Sum_{ChromBlock}| < \beta \times Q$;                              Criterion #2:

in which α corresponds to luminance parameter 710 and β corresponds to chrominance parameter 706. A particular macroblock is identified as AZQ when the four luminance blocks 302 satisfy criterion #1 and the two chrominance blocks 304 satisfy criterion #2. Suitable exemplary parameters are α=8 and β=16, which do tighten the prediction condition somewhat. Although more stringent criteria create additional false negatives (in which some macroblocks that should be identified as AZQ are not), they also reduce the number of false affirmatives (in which the error values of some macroblocks are incorrectly bypassed in favor of all zero values). The false affirmative predictions can degrade the ultimate picture fidelity.

AZQ macroblock predictor 708 produces an affirmative output for macroblocks that are deemed AZQ and a negative output for macroblocks that are not forecasted to be AZQ. The negative output of AZQ macroblock predictor 708 precipitates the control signal to cause switch 206C (of FIG. 2) to be in the down or lower position and to cause DCT 208 and Q 210 to be enabled (or at least not disabled). Thus, no bypass is effectuated, and all zero values of DCT/Q bypasser 204 are not provided to VLC 212. Instead, the transformed and quantized error values are forwarded from the output of Q 210 through switch 206C to VLC 212.

The affirmative output of AZQ macroblock predictor 708 precipitates the control signal to cause switch 206C to be in the upper position and to cause DCT 208 and Q 210 to be disabled. Thus, a bypass is effectuated, and all zero values from an output of DCT/Q bypasser 204 are provided to VLC 212 via switch 206C. Consequently, the processing and other resource usage for the DCT and quantization functionality may be saved by DCT/Q bypasser 204 for at least some inter-macroblocks. In other words, the battery, computational, etc. resources consumed by DCT 208 and Q 210 are saved if DCT/Q bypasser 204 forecasts an AZQ macroblock and therefore bypasses DCT 208 and Q 210.

Figure 8:
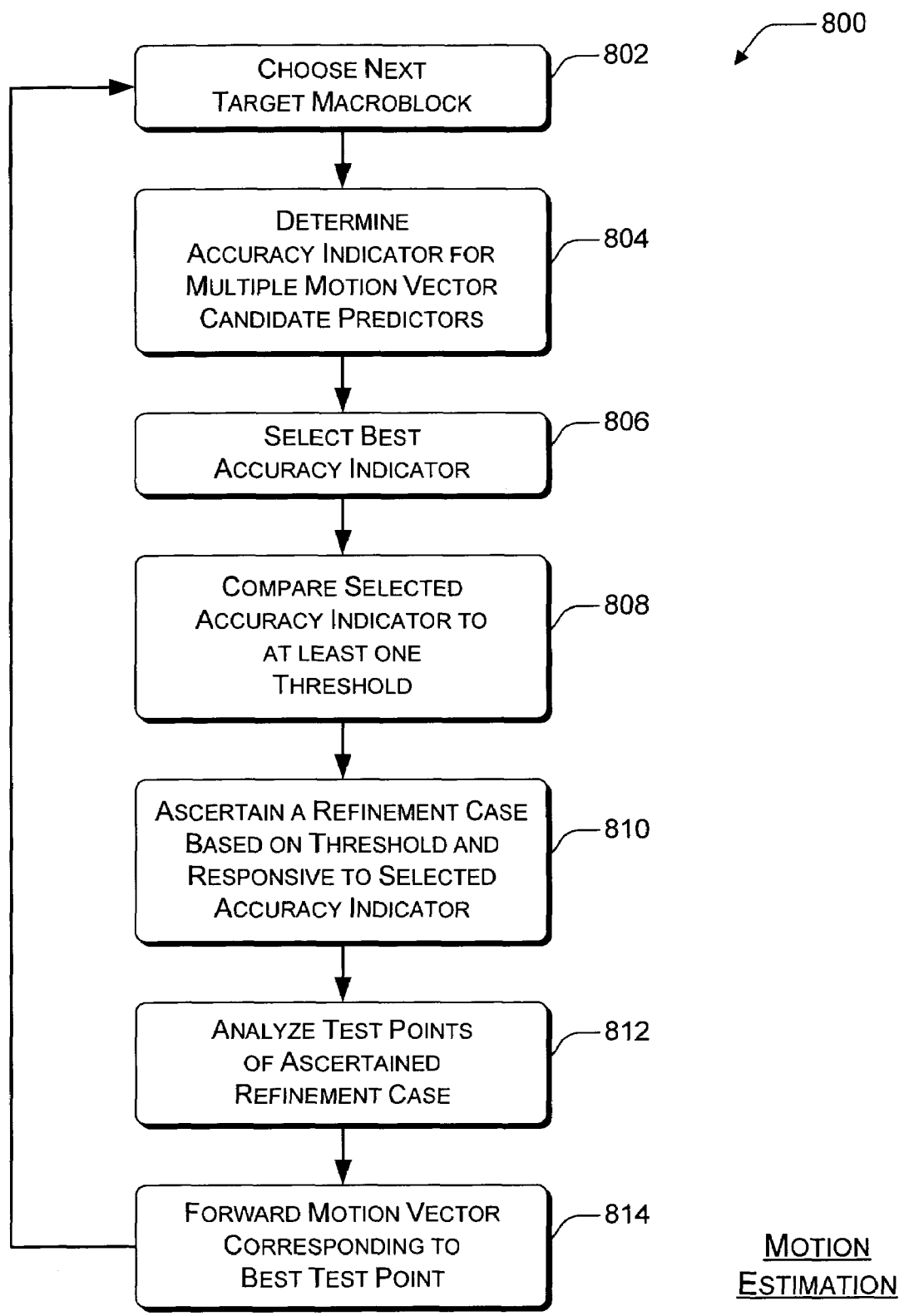
FIG. 8 is a flow diagram that illustrates an exemplary method for motion estimation.

FIG. 8 is a flow diagram 800 that illustrates an exemplary method for motion estimation. Flow diagram 800 includes seven (7) blocks 802-814. Although the actions of flow diagram 800 may be performed in other environments and with a variety of e.g. software schemes, FIGS. 2 and 4-6C are used in particular to illustrate certain aspects and examples of the method. For example, the actions of blocks 802-814 may be performed by motion estimation 220.

At block 802, the next target macroblock is chosen. For example, the next target/current macroblock 506 to be addressed for motion vector estimation may be chosen. At block 804, an accuracy indicator for multiple motion vector candidate predictors is determined. For example, an accuracy indicator for each motion vector candidate of a candidate predictor set 402 may be determined by an accuracy determiner 414 by comparing each corresponding reference macroblock candidate to target macroblock 506.

At block 806, a best accuracy indicator is selected from among the determined accuracy indicators. For example, a candidate selector 404 may select the motion vector candidate corresponding to the best determined accuracy indicator and therefore the corresponding selected reference macroblock from among the reference macroblock candidates. In an SAD accuracy indicator implementation, for instance, the lowest determined SAD is the best accuracy indicator.

At block 808, the selected accuracy indicator is compared to at least one threshold. For example, the accuracy indicator corresponding to the selected motion vector candidate may be compared to a first threshold 408(1) and possibly a second threshold 408(2) by a refinement case ascertainer 406.

At block 810, a refinement case is ascertained based on the at least one threshold and responsive to the selected accuracy indicator. For example, a refinement case 410(1, 2, or 3) may be ascertained based on first and second thresholds 408(1) and 408(2) and responsive to the accuracy indicator corresponding to the selected motion vector candidate. For instance, each refinement case 410 may be assigned to/associated with a range of values for the accuracy indicators, with the range of values being delineated by first and second thresholds 408(1) and 408(2).

At block 812, test points of the ascertained refinement case are analyzed. For example, pixel locations that are adjacent-to or two-pixels-away-from a central pixel of the selected motion vector candidate and that are in a cross or square pattern may be analyzed, depending on the ascertained refinement case 410(1, 2, or 3). For instance, accuracy determiner 414 may determine a respective accuracy indicator for each respective test point of the ascertained refinement case 410(1, 2, or 3) to create a collection of respective accuracy indicators, which may include the accuracy indicator of the central pixel.

To create the collection of respective accuracy indicators, accuracy determiner 414 compares target macroblock 506 to reach respective test reference macroblock for each corresponding test point in the collection of test points defined by the ascertained refinement case 410(1, 2, or 3). Refinement case analyzer 412 then selects the best accuracy indicator from the collection of accuracy indicators, the selected respective accuracy indicator associated with a respective test point and therefore a respective test reference macroblock.

At block 814, a motion vector corresponding to the best test point is forwarded. For example, a motion vector corresponding to the respective test point that is associated with the selected best accuracy indicator may be forwarded from refinement case analyzer 412. The motion vector may be defined by a pixel location of the best test point, by a directed distance between target macroblock 506 and the best test point, and so forth. The forwarded best motion vector is mappable and/or at least partially equivalent to the selected reference macroblock for current macroblock 506.

Figure 9:
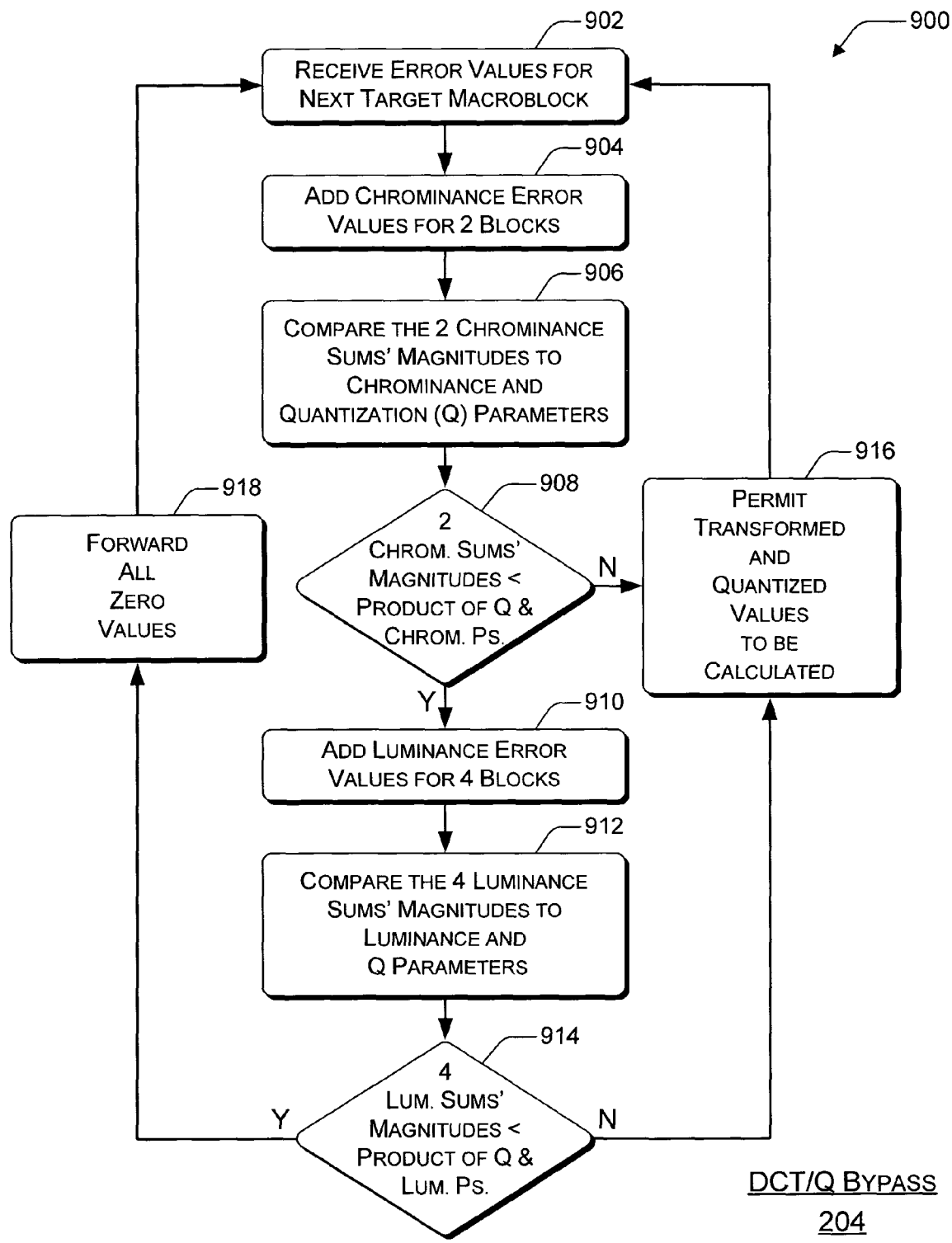
FIG. 9 is a flow diagram that illustrates an exemplary method for DCT/Q bypassing.

FIG. 9 is a flow diagram 900 that illustrates an exemplary method for DCT/Q bypassing. Flow diagram 900 includes nine (9) blocks 902-918. Although the actions of flow diagram 900 may be performed in other environments and with a variety of e.g. software schemes, FIGS. 2 and 7 are used in particular to illustrate certain aspects and examples of the method. For example, the actions of blocks 902-918 may be performed by DCT/Q bypasser 204.

At block 902, the error values for the next target macroblock are received. For example, the error values for both luminance and chrominance blocks 302 and 304 for the next target/current macroblock 506 are received. At block 904, chrominance error values for two blocks are added together. For example, 64 chrominance error values for each of two chrominance blocks 304 may be summed by summation of chrominance values per block component 704.

At block 906, the magnitudes of two chrominance sums are compared to chrominance and quantization parameters. For example, a magnitude of the output of summation of chrominance values per block component 704 may be compared to chrominance parameter 706 and the quantization parameter Q by AZQ macroblock predictor 708. At block 908, it is determined if the two chrominance sums have magnitudes that are each less than a product of the quantization parameter Q and the chrominance parameter.

If it is determined (at block 908) that the two chrominance sums' magnitudes are not each less than the product of the quantization parameter Q and the chrominance parameter, then at block 916 transformed and quantized values are permitted to be calculated (and forwarded). For example, DCT 208 and Q 210 may be enabled, and transformed and quantized values from the output of Q 210 may be permitted to be forwarded through switch 206C and towards VLC 212 via a control signal from DCT/Q bypasser 204.

If, on the other hand, it is determined (at block 908) that the two chrominance sums' magnitudes are each less than the product of the quantization parameter Q and the chrominance parameter, then at block 910 luminance error values for four blocks are added together. For example, 64 luminance error values for each of four luminance blocks 302 may be summed by summation of luminance values per block component 702.

At block 912, the magnitudes of four luminance sums are compared to luminance and quantization parameters. For example, a magnitude of the output of summation of luminance values per block component 702 may be compared to luminance parameter 710 and the quantization parameter Q by AZQ macroblock predictor 708. At block 914, it is determined if the four luminance sums have magnitudes that are each less than a product of the quantization parameter Q and the luminance parameter.

If it is determined (at block 914) that the four luminance sums' magnitudes are not each less than the product of the quantization parameter Q and the luminance parameter, then at block 916 the transformed and quantized values are permitted to be calculated (and forwarded).

If, on the other hand, it is determined (at block 914) that the four luminance sums' magnitudes are each less than the product of the quantization parameter Q and the luminance parameter, then at block 918 all zero values for the error values of the target macroblock are forwarded. For example, all zero values are output from DCT/Q bypasser 204 and forwarded to VLC 212 via switch 206C in accordance with an output control signal, which also disables DCT 208 and Q 210.

The actions, aspects, features, components, etc. of FIGS. 1-9 are illustrated in diagrams that are divided into multiple blocks. However, the order, interconnections, layout, etc. in which FIGS. 1-9 are described and/or shown is not intended to be construed as a limitation, and any number of the blocks can be combined, rearranged, augmented, omitted, etc. in any manner to implement one or more systems, methods, devices, procedures, media, APIs, apparatuses, arrangements, etc. for video coding. Furthermore, although the description herein includes references to specific implementations (and the exemplary operating environment of FIG. 10), the illustrated and/or described implementations can be implemented in any suitable hardware, software, firmware, or combination thereof and using any suitable device architecture(s), encoding standard(s), video encoder scheme(s), frame segmentation format(s), and so forth.

Figure 10:
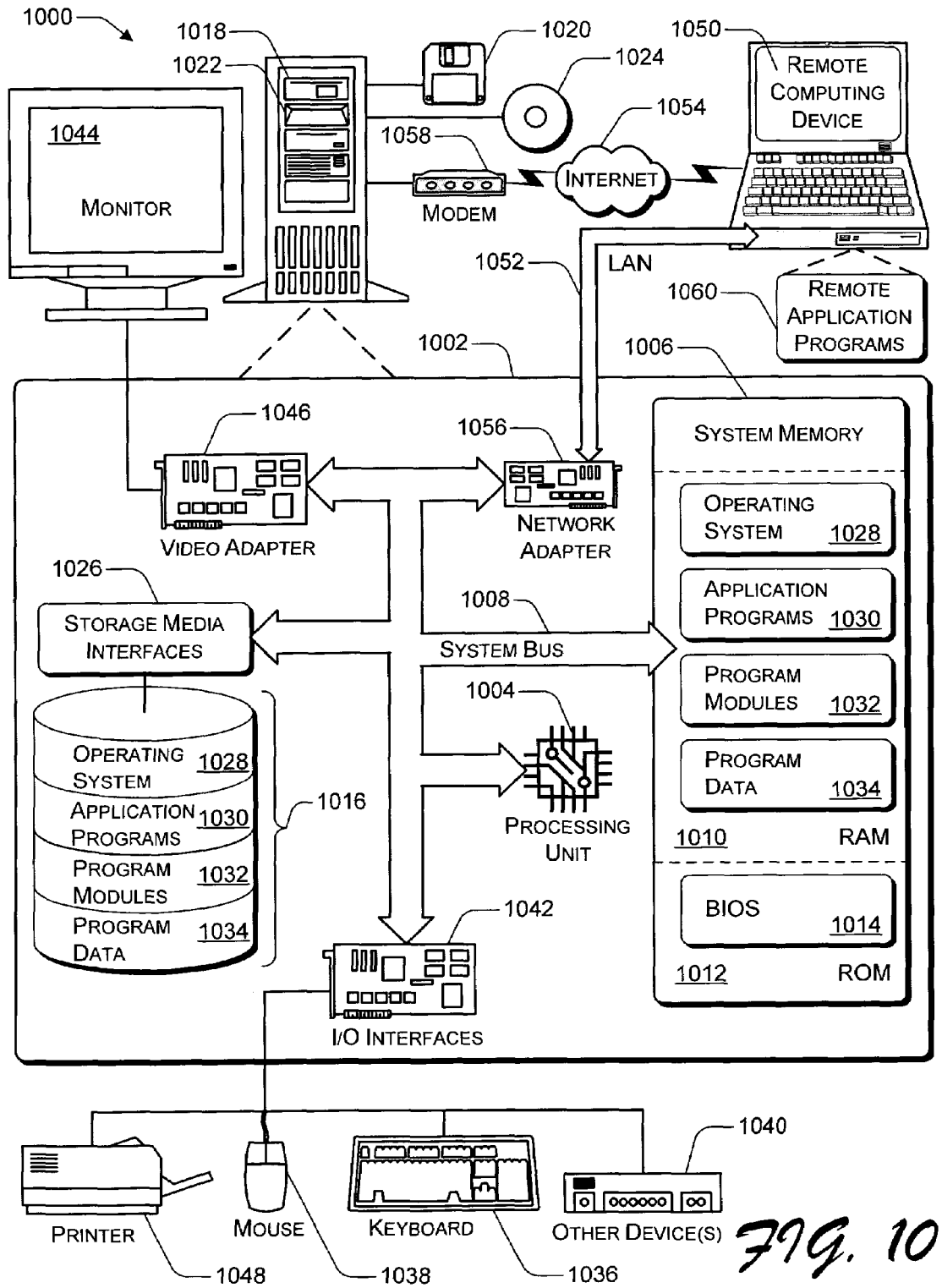
FIG. 10 illustrates an exemplary computing (or general device) operating environment that is capable of (wholly or partially) implementing at least one aspect of video coding as described herein.

FIG. 10 illustrates an exemplary computing (or general device) operating environment 1000 that is capable of (fully or partially) implementing at least one system, device, apparatus, component, arrangement, protocol, approach, method, procedure, media, API, some combination thereof, etc. for video coding as described herein. Operating environment 1000 may be utilized in the computer and network architectures described below or in a stand-alone situation, including mobile device scenarios.

Exemplary operating environment 1000 is only one example of an environment and is not intended to suggest any limitation as to the scope of use or functionality of the applicable device (including computer, network node, entertainment device, mobile appliance, general electronic device, etc.) architectures. Neither should operating environment 1000 (or the devices thereof) be interpreted as having any dependency or requirement relating to any one or to any combination of components as illustrated in FIG. 10.

Additionally, video coding may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, network nodes, distributed or multi-processing computing environments that include any of the above systems or devices, some combination thereof, and so forth.

Implementations for video coding may be described in the general context of processor-executable instructions. Generally, processor-executable instructions include routines, programs, protocols, objects, interfaces, components, data structures, etc. that perform and/or enable particular tasks and/or implement particular abstract data types. Video coding, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Exemplary operating environment 1000 includes a general-purpose computing device in the form of a computer 1002, which may comprise any (e.g., electronic) device with computing/processing capabilities. The components of computer 1002 may include, but are not limited to, one or more processors or processing units 1004, a system memory 1006, and a system bus 1008 that couples various system components including processor 1004 to system memory 1006.

Processors 1004 are not limited by the materials from which they are formed or the processing mechanisms employed therein. For example, processors 1004 may be comprised of semiconductor(s) and/or transistors (e.g., electronic integrated circuits (ICs)). In such a context, processor-executable instructions may be electronically-executable instructions. Alternatively, the mechanisms of or for processors 1004, and thus of or for computer 1002, may include, but are not limited to, quantum computing, optical computing, mechanical computing (e.g., using nanotechnology), and so forth.

System bus 1008 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1002 typically includes a variety of processor-accessible media. Such media may be any available media that is accessible by computer 1002 or another (e.g., electronic) device, and it includes both volatile and non-volatile media, removable and non-removable media, and storage and transmission media.

System memory 1006 includes processor-accessible storage media in the form of volatile memory, such as random access memory (RAM) 1040, and/or non-volatile memory, such as read only memory (ROM) 1012. A basic input/output system (BIOS) 1014, containing the basic routines that help to transfer information between elements within computer 1002, such as during start-up, is typically stored in ROM 1012. RAM 1010 typically contains data and/or program modules/instructions that are immediately accessible to and/or being presently operated on by processing unit 1004.

Computer 1002 may also include other removable/non-removable and/or volatile/non-volatile storage media. By way of example, FIG. 10 illustrates a hard disk drive or disk drive array 1016 for reading from and writing to a (typically) non-removable, non-volatile magnetic media (not separately shown); a magnetic disk drive 1018 for reading from and writing to a (typically) removable, non-volatile magnetic disk 1020 (e.g., a "floppy disk"); and an optical disk drive 1022 for reading from and/or writing to a (typically) removable, non-volatile optical disk 1024 such as a CD, DVD, or other optical media. Hard disk drive 1016, magnetic disk drive 1018, and optical disk drive 1022 are each connected to system bus 1008 by one or more storage media interfaces 1026. Alternatively, hard disk drive 1016, magnetic disk drive 1018, and optical disk drive 1022 may be connected to system bus 1008 by one or more other separate or combined interfaces (not shown).

The disk drives and their associated processor-accessible media provide non-volatile storage of processor-executable instructions, such as data structures, program modules, and other data for computer 1002. Although exemplary computer 1002 illustrates a hard disk 1016, a removable magnetic disk 1020, and a removable optical disk 1024, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the exemplary operating environment 1000.

Any number of program modules (or other units or sets of instructions/code) may be stored on hard disk 1016, magnetic disk 1020, optical disk 1024, ROM 1012, and/or RAM 1040, including by way of general example, an operating system 1028, one or more application programs 1030, other program modules 1032, and program data 1034.

A user may enter commands and/or information into computer 1002 via input devices such as a keyboard 1036 and a pointing device 1038 (e.g., a "mouse"). Other input devices 1040 (not shown specifically) may include a microphone, joystick, game pad, satellite dish, serial port, scanner, and/or the like. These and other input devices are connected to processing unit 1004 via input/output interfaces 1042 that are coupled to system bus 1008. However, input devices and/or output devices may instead be connected by other interface and bus structures, such as a parallel port, a game port, a universal serial bus (USB) port, an infrared port, an IEEE 1394 "Firewire") interface, an IEEE 802.11 wireless interface, a Bluetooth® wireless interface, and so forth.

A monitor/view screen 1044 or other type of display device may also be connected to system bus 1008 via an interface, such as a video adapter 1046. s Video adapter 1046 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 1044, other output peripheral devices may include components such as speakers (not shown) and a printer 1048, which may be connected to computer 1002 via input/output interfaces 1042.

Computer 1002 may operate in a networked environment using logical connections to one or more remote computers, such as a remote computing device 1050. By way of example, remote computing device 1050 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1050 is illustrated as a portable computer that may include many or all of the elements and features described herein with respect to computer 1002.

Logical connections between computer 1002 and remote computer 1050 are depicted as a local area network (LAN) 1052 and a general wide area network (WAN) 1054. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media.

When implemented in a LAN networking environment, computer 1002 is usually connected to LAN 1052 via a network interface or adapter 1056. When implemented in a WAN networking environment, computer 1002 typically includes a modem 1058 or other means for establishing communications over WAN 1054. Modem 1058, which may be internal or external to computer 1002, may be connected to system bus 1008 via input/output interfaces 1042 or any other appropriate mechanism(s). It is to be appreciated that the illustrated network connections are exemplary and that other means of establishing communication link(s) between computers 1002 and 1050 may be employed.

In a networked environment, such as that illustrated with operating environment 1000, program modules or other instructions that are depicted relative to computer 1002, or portions thereof, may be fully or partially stored in a remote media storage device. By way of example, remote application programs 1060 reside on a memory component of remote computer 1050 but may be usable or otherwise accessible via computer 1002. Also, for purposes of illustration, application programs 1030 and other processor-executable instructions such as operating system 1028 are illustrated herein as discrete blocks, but it is recognized that such programs, components, and other instructions reside at various times in different storage components of computing device 1002 (and/or remote computing device 1050) and are executed by processor(s) 1004 of computer 1002 (and/or those of remote computing device 1050).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A device comprising:
a candidate selector that is capable of accepting a current macroblock, the candidate selector adapted to select a motion vector candidate from a set of motion vector candidates with regard to the current macroblock using an accuracy indicator corresponding to the selected motion vector candidate;
a refinement case ascertainer that is capable of accepting the selected motion vector candidate and the accuracy indicator corresponding thereto, the refinement case ascertainer adapted to ascertain a refinement case from among a plurality of refinement cases based on a first threshold and a second threshold and responsive to the accuracy indicator,
wherein the plurality of refinement cases comprises a first case, a second case, and a third case, and
wherein the refinement case ascertainer is configured to implement the following selection criteria:
if the accuracy indicator is less than the first threshold, then the first case is ascertained;
if the first threshold is less than the accuracy indicator which is less than the second threshold, then the second case is ascertained; and
if the accuracy indicator is greater than the second threshold, then the third case is ascertained; and
a refinement case analyzer that is capable of accepting the ascertained refinement case, the refinement case analyzer adapted to analyze a collection of points defined by the ascertained refinement case with regard to the current macroblock to potentially refine the selected motion vector candidate;
wherein the refinement case analyzer is adapted
(i) to analyze the first case, when ascertained by the refinement case ascertainer, by testing four contiguous points at the selected motion vector candidate on a cross direction,
(ii) to analyze the second case, when ascertained by the refinement case ascertainer, by testing eight contiguous points around the selected motion vector candidate, and
(iii) to analyze the third case, when ascertained by the refinement case ascertainer, by testing eight points that are round and that are two pixels away from the selected motion vector candidate.

2. The device as recited in claim 1, wherein the candidate selector is further capable of accepting a current frame that includes the current macroblock.

3. The device as recited in claim 1, wherein the candidate selector is further capable of accepting a reference frame, the candidate selector configured to extract reference macroblock candidates from the reference frame in accordance with the set of motion vector candidates.

4. The device as recited in claim 3, wherein the candidate selector is further configured to determine a respective accuracy indicator for each of the reference macroblock candidates; the candidate selector further adapted to select the selected motion vector candidate by selecting the motion vector candidate corresponding to a best respective accuracy indicator.

5. The device as recited in claim 1, wherein the set of motion vector candidates consists of three motion vectors and a null vector.

6. The device as recited in claim 1, wherein the set of motion vector candidates comprises two motion vectors from two macroblocks that are temporally identical and spatially contiguous to the current macroblock and one motion vector from one macroblock that is spatially identical and temporally contiguous to the current macroblock.

7. The device as recited in claim 1, wherein the device further comprises:
an accuracy indicator determiner that determines accuracy indicators for reference macroblocks from a reference frame with regard to the current macroblock of a current frame.

8. The device as recited in claim 7, wherein the accuracy indicator determiner comprises a sum of absolute differences (SAD) determiner.

9. The device as recited in claim 1, wherein each refinement case of the plurality of refinement cases defines a plurality of test points.

10. The device as recited in claim 1, wherein the refinement case ascertainer is configured to associate a respective refinement case of the plurality of refinement cases to a respective range of accuracy values of a plurality of ranges of accuracy values, the plurality of ranges of accuracy values at least partially delineated by the first threshold and the second threshold; wherein the refinement case ascertainer is further adapted to ascertain the ascertained refinement case by ascertaining the respective range of accuracy values of the plurality of ranges of accuracy values in which the accuracy indicator belongs.

11. The device as recited in claim 1, wherein the refinement case analyzer is further adapted to refine the selected motion vector candidate when an accuracy indicator corresponding to a point of the collection of points is better than the accuracy indicator corresponding to the selected motion vector candidate.

12. The device as recited in claim 1, wherein the collection of points includes a plurality of test points and a central pixel that corresponds to the selected motion vector candidate.

13. The device as recited in claim 1, wherein the refinement case analyzer is configured to select a best accuracy indicator from a collection of respective accuracy indicators created for respective points of the collection of points.

14. The device as recited in claim 1, wherein the device further comprises:
a discrete cosine transform (DCT) component that performs integer DCT calculations on residual error values in a video encoding operation.

15. The device as recited in claim 1, wherein the device further comprises:
an inverse discrete cosine transform (IDCT) component that performs integer IDCT calculations on transformed and quantized residual error values in a video encoding operation.

16. The device as recited in claim 1, wherein the device comprises a mobile device having a wireless interface.

* * * * *

UNITED STATES PATENT AND TRADEMARK OFFICE
CERTIFICATE OF CORRECTION

PATENT NO. : 7,366,237 B2
APPLICATION NO. : 10/658839
DATED : April 29, 2008
INVENTOR(S) : Keman Yu et al.

It is certified that error appears in the above-identified patent and that said Letters Patent is hereby corrected as shown below:

In column 17, line 44, in Claim 1, delete "round" and insert -- around --, therefor.

Signed and Sealed this
Nineteenth Day of July, 2011

David J. Kappos
*Director of the United States Patent and Trademark Office*